United States Patent Office 2,707,707
Patented May 3, 1955

2,707,707

BIURET-UREA BLOWING AGENT USED FOR PRODUCING CELLULAR MATERIALS

Herbert F. Schwarz, Chicago, Ill., assignor to The Sherwin-Williams Company, Cleveland, Ohio, a corporation of Ohio No Drawing. Application May 5, 1949,
Serial No. 91,630

11 Claims. (Cl. 260—2.5)

This invention relates to the manufacture of cellular products from materials which may be expanded and set in an expanded state. More particularly, this invention relates to a new and improved process for the manufacture of cellular natural or synthetic rubber products, known in the industry as "sponge rubber."

This application is a continuation-in-part of my copending application Serial No. 586,622, filed April 4, 1945.

The principal method of producing cellular rubber products is to incorporate into the soft unvulcanized rubber mix a heat decomposable chemical or chemicals, and to heat the resultant mix to such a temperature that the heat decomposable chemical or chemicals are decomposed to form bubbles of gas or vapor distributed within the rubber mixture. The chemicals used for this purpose are usually referred to as blowing agents or gas producing agents. The bubbles of gas cause the rubber mixture to expand, and while in the expanded state the rubber mixture is vulcanized, usually with the aid of the heat which is used to decompose the blowing agent. The result is a cellular or porous type product, usually referred to in the rubber industry as "sponge rubber."

The chemicals most frequently used for this purpose are sodium bicarbonate, ammonium bicarbonate and diazo-amino-benzene. Some of the disadvantages of these blowing agents are as follows:

Sodium bicarbonate is used either alone, or, more commonly, with certain fatty acids which promote the decomposition of the sodium bicarbonate (i. e., enable decomposition to take place at a lower temperature or with less sodium bicarbonate being used). The principal products of the decomposition of sodium bicarbonate are carbon dioxide, water, and the sodium salts of the natural rubber acids or of any added fatty acids. The chief virtue of sodium bicarbonate is its cheapness. The disadvantages are that it is difficult to disperse through the rubber mix, it gives a coarse uneven blow, it imparts to the rubber product a harsh "feel," it adversely affects the cure produced by many accelerators used in vulcanization, and it is usually necessary to use fairly large quantities of fatty acids in order to obtain sufficient blowing effect to produce satisfactory expansion of the mix. In the latter case there is left in the rubber product relatively large amounts of water soluble sodium soaps of the fatty acids used. These are leached out if the rubber product is immersed in water.

Ammonium bicarbonate is used alone. It produces carbon dioxide, water, and ammonia when heated. The disadvantages are: it is unstable in storage and may be partially decomposed before being used, it is unstable when incorporated into the rubber mix and therefore the unvulcanized mix may be partially blow during storage prior to the time it is desired to vulcanize the rubber, and it is usually irregular in crystal structure, thus producing cells of widely different sizes after vulcanization and a rubber product of non-uniform texture.

A further disadvantage of both sodium bicarbonate and ammonium bicarbonate is that it is usually necessary to compress the sponge product by putting it through wringing rolls immediately after it is removed from the mold or vulcanizer. This is done because water vapor is produced when either sodium bicarbonate or ammonium bicarbonate is used as a blowing agent, and it is necessary to break the walls of the cells by compression and replace the water vapor in the cells with air. If the water vapor is allowed to remain in the cells, it will condense to water when the product is cooled to room temperature and the cells will collapse, thus eliminating to a substantial extent the cellular structure. The process of compressing or wringing the sponge product is costly because of the labor and equipment necessary.

Diazo-amino-benzene is used alone, although it may be used in conjunction with sodium bicarbonate in order to minimize the disadvantages of each. The products of decomposition are nitrogen and certain organic chemicals. The disadvantages are: it is much more expensive than other blowing agents, it belongs to the group of chemicals, called azo-like dyes, which are used as dyes or coloring agents and for that reason it imparts an objectionable color to everything with which it comes in contact, so much so that it is difficult to make a cellular product in a desired color; and it is of relatively low solubility in rubber and synthetic rubber and will therefore come to the surface (termed "bloom to the surface") and stay as a surface coating on the unvulcanized or vulcanized rubber product, thereby staining or coloring any material or fabric which comes in contact with the rubber product.

One of the objects of the present invention is to provide a new and improved method for producing cellular materials.

Another object is to provide a method of producing cellular materials in which the blowing agent is relatively inexpensive, is easy to incorporate into a solid rubber mix on the rubber mill, and has the ability to generate relatively large quantities of gas per unit weight of the chemical used.

Still a further object of the invention is to provide a new and improved type of blowing composition for making cellular products which is characterized by stability against substantial gas generation under ordinary storage conditions, the ability to generate gas at elevated temperatures, and the ability to generate gas in medium sized cells or pockets that are neither too large nor too small.

An additional object of the invention is to provide a method of generating a gas in rubber which does not easily diffuse through the rubber and which remains in the gaseous state when the rubber is cooled down to room temperature.

Still other objects of the invention are the provision of blowing methods for blowing rubber which are not harmful to the rubber product, nor to workers in the rubber factory, nor to fabrics which come in contact with the finished product, nor to users of the product. Other objects will appear hereinafter.

In accordance with this invention it has been found that new and improved results in the manufacture of cellular products are obtained by blowing the products with a mixture of biuret and urea. The mixture may be prepared by grinding the biuret and urea separately by any suitable manner and then mixing the two together, or by mixing the biuret and urea and then grinding the mixture by any suitable means.

The intimate mixture of biuret and urea is then incorporated or added to the soft unvulcanized rubber mix in such a manner that the temperature of the mix is at all times lower than the temperature at which substantial decomposition of the biuret-urea mixture occurs. For example, one means of producing cellular products is as follows: Incorporate the mixture of biuret and urea into the rubber mix on a rubber mill at temperatures preferably between 70 degrees F. and 212 degrees F. Pass the rubber mix containing the blowing agent through a rubber mill or calender to form a sheet of rubber of the desired thickness. Place the rubber sheet into a mold, which is normally substantially larger than the piece which is inserted in the mold so that expansion and cell formation can occur. Apply heat to the rubber mix, for example, by applying heat to the platens of a hydraulic press, which may be heated to temperatures say of 287 degrees to 320 degrees F. The biuret-urea mixture decomposes and gases are formed in the rubber mass in small pockets. At the same time, since the rubber contains ingredients capable of vulcanizing it at the temperatures used, it will assume a permanent shape conforming to that of the mold.

A preferred type of gas blowing composition for the purpose of the invention contains approximately 1 mole of biuret and 1 mole of urea reduced to the proper particle size and intimately blended together. On the application of heat anhydrous biuret and anhydrous urea unite to produce ammonia according to the following equation:

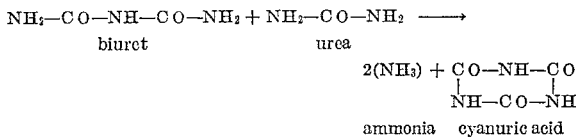

On the application of heat to mixtures of biuret and urea, one or both of which contain water of hydration, decomposition takes place in the manner indicated in the above equation, and in addition there is produced a small quantity of water vapor which is the product of the water of hydration.

At the temperatures used in the sponge rubber industry the ammonia is given off in sufficient quantity to develop an internal pressure greatly in excess of the external pressure. The result is expansion of the rubber compound to produce a multitude of cells which are in effect small pockets of ammonia enclosed in the rubber.

The cyanuric acid which is also produced is in no way harmful to the rubber compound. It does not affect the cure. It is insoluble in water and ordinary solvents; therefore, it will not be affected by water or solvent in which the finished product may be immersed. Cyanuric acid is stable to temperatures above 360 degrees C. (680 degrees F.).

It should be noted that both biuret and urea, when used separately, decompose to give off ammonia. However, a mixture of the two ingredients decomposes at a lower temperature than either ingredient alone. Furthermore, to produce a given quantity of ammonia, a smaller weight of a mixture of biuret and urea is necessary than of either material alone. The blend of the two materials likewise results in sustained gasing power and the formation of the gas in small pockets.

The invention will be further illustrated but is not limited by the following examples in which the quantities are stated in parts by weight:

*Example I*

This example illustrates the compounding of GR-S sponge rubber in accordance with the practice of the invention. The term GR-S refers to a butadiene-styrene polymer of the Buna-S type manufactured by the Rubber Reserve Corporation.

The formulas A, B, C and D given in this example cover cellular products ranging from apparent density of 0.15 to 0.22 ounce per cubic inch or 220% to 320% in terms of percentage blow.

The synthetic rubber polymer (GR-S) should be well broken down, although not to the extent that is necessary when using sodium bicarbonate as the blowing agent. Proper plasticity may be obtained by a suitable milling period or by the addition of a suitable plasticizer.

The reinforcing fillers such as the various carbon blacks, which are necessary to give even moderate tensile strength to this type of rubber, can be used without producing too stiff an uncured stock, provided sufficient quantities of softeners are present.

The use of biuret-urea blowing agent requires no substantial change in the standard practice of using delayed action acceleration in sponge rubber production. The accelerator combinations specified in A, B, C and D are among those that have been found satisfactory.

The quantity of blowing agent (containing approximately 1 mole of biuret and approximately 1 mole of urea) used may vary, depending upon the plastic polymer employed, however, in the case of GR-S synthetic rubber, the range of 4 to 15 parts of urea and biuret blowing agent per 100 parts of rubber is preferred.

By manipulations well known to those skilled in the art, the following formulations may be compounded and then processed to produce sponge or cellular products. It will be understood that these examples are illustrative and do not limit the practice of the invention.

| | A | B | C | D |
|---|---|---|---|---|
| Formulas for GR-S Sponge: | | | | |
| GR-S (15 min. break)[1] | 100 | 100 | 100 | 100 |
| MT Thermal Black (Medium thermal type carbon black) | | 20 | 20 | 10 |
| SRF Furnace Black (Semi-reinforcing furnace type carbon black) | 40 | | | 5 |
| HMF Furnace Black (High modulus furnace type carbon black) | | 20 | 40 | |
| Whiting | | | 40 | |
| Zinc Oxide | 3 | 3 | 3 | 3 |
| Altax-Thiofide-MBTS (Benzothiazyl disulfide) | | | 1 | |
| Monex-Thionex (Tetramethyl thiuram monosulfide) | | | 0.1 | |
| Santocure (Benzothiazyl 2-monocyclohexyl sulfenamide) | 1.5 | 1.5 | | 1.5 |
| Circo Process Oil (A petroleum type oil-softener) | 50 | | | 35 |
| An aromatic petroleum oil | | 40 | | |
| Dispersing Oil #10 (A coal tar type oil-softener) | | | 45 | |
| Agerite Powder (Phenyl-beta-naphthylamine) | 1 | 1 | 1 | 1 |
| Sulfur | 2.5 | 2.5 | 2.5 | 2.5 |
| Blend of 1 mole biuret and 1 mole urea | 8.5 | 6.5 | 6 | 5 |
| Physical Properties: | | | | |
| Press Cure at 324° F. (Min) | 15 | 15 | 15 | 15 |
| Press Cure at 311° F. (min) | 20 | 20 | 20 | 20 |
| Percent Blow | 320 | 220 | 220 | 250 |
| Apparent Density (oz./cu. in.) | 0.15 | 0.20 | 0.22 | 0.17 |

[1] Two to four parts of RPA No. 5 (zinc salt of the mercaptan of a hydrocarbon in a neutral solvent) or two to four parts of JMH (alpha nitroso beta naphthol) can be used instead of 15 min. milling.

*Example II*

This example illustrates the practice of the invention in preparing an ebonite (hard rubber) stock whereby a very interesting type of cellular product is obtained. This product is a light weight but strong product which will float on water indefinitely and is characterized by a predominant number of closed cells.

The production of cellular ebonite from butadiene-styrene polymer (GR-S) presents a greater problem than that encountered with soft GR-S because the stock must be held inflated for a longer period of time before the cure is completed. It wil be understood that the following formula is illustrative only and that variations can be made therein without departing from the invention:

Formula for cellular GR–S ebonite: E
- GR–S (15 min. break) [1] _____ 100
- Santocure (benzothiazyl 2 - monocyclohexyl sulfenamide _____ 3
- SRF Furnace Black (semi-reinforcing furnace type carbon black) _____ 30
- MT Thermal Black (medium thermal type carbon black) _____ 50
- Zinc oxide _____ 3
- Naftolen 510-Dutrex 6 (unsaturated petroleum residue) _____ 70
- Sulfur _____ 50
- Blend of 1 mole biuret and 1 mole urea _____ 9

[1] Two to four parts of RPA No. 5 (zinc salt of the mercaptan of a hydrocarbon in a neutral solvent) or two to four parts of JMH (alpha nitroso beta naphthol) can be used instead of 15 min. milling.

Physical properties:
- Press cure at 324 degrees F. (min.) _____ 105
- Percent blow _____ 280
- Apparent density (oz./cu. in.) _____ 0.20

*Example III*

This example illustrates the preparation of a cellular rubber from Buna N (GR–A). It is somewhat more difficult to prepare cellular products from Buna N than from GR–S due to the less plastic quality of raw polymer and the greater difficulty of plasticizing on the mill. However, by proper compounding Buna N sponge can be made fully as satisfactory as from GR–S.

In order to compensate for the nerve of Buna N, it is preferable that those grades of Buna N which are easiest to break down on the mill be used in making sponge. In addition, it is desirable to incorporate rather large quantities of plasticizer.

The following formulas illustrate how the invention may be practiced:

|  | F | G | H |
|---|---|---|---|
| Formulas For Buna N Sponge: |  |  |  |
| Chemigum N-1 (15 min. break) | 100 |  |  |
| Butaprene NM (15 min. break) |  | 100 |  |
| Hycar OR-15 (15 min. break) |  |  | 100 |
| SRF Furnace Black (Semi-reinforcing furnace type carbon black) | 30 |  |  |
| FT Thermal Black (Fine thermal type carbon black) |  | 40 |  |
| MT Thermal Black (Medium thermal type carbon black) |  |  | 60 |
| Zinc Oxide | 3 | 3 | 3 |
| Stearic Acid | 0.5 | 0.5 | 0.5 |
| Agerite Powder (Phenyl-beta, naphthyl-amine) | 1 | 1 | 1 |
| Santocure (Benzothiazyl 2-monocyclohexyl sulfenamide) | 1.3 | 1.2 |  |
| Altax-Thiofide-MBTS (Benzothiazyl disulfide) |  |  | 1.5 |
| Tuads-Thiurad-Thiuram M-Tuex (Tetramethyl thiuram disulfide) |  |  | 0.1 |
| Dibutyl Phthalate | 80 | 75 | 80 |
| Sulfur | 2 | 2.2 | 2 |
| Blend of 1 mole biuret and 1 mole urea | 10 | 10 | 12 |
| Physical Properties: |  |  |  |
| Press Cure at 311° F. (Min) | 30 | 30 | 30 |
| Percent Blow | 240 | 230 | 210 |
| Apparent Density (oz/cu. in.) | 0.19 | 0.20 | 0.22 |

*Example IV*

This example illustrates the application of the invention to the manufacture of cellular products from Neoprene GN (GR–M).

Formula for Neoprene sponge: J
- Neoprene GN–A (15 min. break) [1] _____ 100
- MT Thermal Black (medium thermal type carbon black) _____ 15
- Whiting _____ 60
- Stearic acid _____ 1
- Neoprene Process Oil (a petroleum type oil-softener) _____ 25
- Agerite powder (phenyl-beta-naphthylamine) __ 2
- Ex. light calcined magnesia _____ 4
- Zinc oxide _____ 5
- Blend of 1 mole biuret and 1 mole urea _____ 9

[1] 0.2 to 0.5 part of Pip-Pip or Accelerator No. 552 (piperidinium pentamethylene dithiocarbamate) may be used instead of 15 min. milling.

Physical properties:
- Press cure at 324 degrees F. (min.) _____ 30
- Percent blow _____ 300
- Apparent density (oz./cu. in.) _____ 0.22

*Example V*

This example illustrates how the invention may be practiced for the preparation of cellular products from reclaimed rubber:

|  | K | L |
|---|---|---|
| Formulas for Reclaimed Rubber Sponge: |  |  |
| Whole Tire Reclaim (M-67-A) | 100 | 100 |
| MT Thermal Black (Medium thermal type carbon black) | 40 |  |
| Whiting |  | 40 |
| Zinc Oxide | 3 | 3 |
| Stearic Acid | 2 | 2 |
| Altax-Thiofide-MBTS (Benzothiazyl disulfide) | 1 | 1 |
| Tuads-Thiurad-Thiuram M-Tuex (Tetramethyl thiuram disulfide) |  | 0.2 |
| Monex-Thionex (Tetramethyl thiuram monosulfide) | 0.2 |  |
| Agerite Powder (Phenyl-beta-naphthylamine) | 1 | 1 |
| Circo Process Oil (A petroleum type oil-softener) | 30 | 25 |
| Sulfur | 3 | 3 |
| Blend of 1 mole biuret and 1 mole urea | 5 | 5 |
| Physical Properties: |  |  |
| Press Cure at 311° F. (min.) | 15 | 15 |
| Percent Blow | 360 | 450 |
| Apparent Density (oz/cu. in.) | 0.16 | 0.14 |

*Example VI*

The following example illustrates the application of the invention to the preparation of cellular products where the urea and biuret are employed in conjunction with other blowing agents. The following batches were mixed on a rubber mill and were sheeted off in thin sheets:

|  | A | B | C | D |
|---|---|---|---|---|
| Natural Rubber Smoked Sheets | 50 | 50 | 50 | 50 |
| GR–S Synthetic Rubber | 50 | 50 | 50 | 50 |
| Zinc Oxide | 4 | 4 | 4 | 4 |
| Diatomaceous Earth | 20 |  |  | 20 |
| Calcium Carbonate |  | 70 |  | 30 |
| SRF Carbon Black |  |  | 40 |  |
| Mineral Oil | 30 | 5 |  | 30 |
| Sulfur | 40 | 50 | 40 | 60 |
| Phenyl-beta-naphthylamine | 3 | 3 | 3 | 3 |
| Mercaptobenzothiazole | 2 | 2 | 2 | 2 |
| n-cyclohexyl-2-benzothiazole sulfonamide | 1.2 | 1.3 | 1.3 |  |
| Tetramethyl Thiuram disulfide |  |  |  | 1.5 |
| Stearic Acid | 0.2 | 0.1 | 0.1 |  |
| Diazo-amino-benzene | 2 | 15 | 10 | 4 |
| Sodium Bicarbonate | 0.5 |  |  |  |
| Blend of 1 mole of biuret and 1 mole of urea | 2 | 12 | 8 | 4 |
|  |  | 1 | 3 | 8 |

Each of the foregoing batches produced a satisfactory cure when slabs of the product were molded and cured in a hydraulic press with heat being applied through steam platens for 15 minutes at a temperature of 324 degrees F.

Batch A shows the use of a blowing agent composed of one mole of biuret and one mole of urea in conjunction with diazo-amino-benzene as a blowing agent in order to obtain the good properties of each type of blowing agent. Since diazo-amino-benzene causes staining and discolorization when used in even moderate amounts, it is sometimes desirable to use only a small amount of diazo-amino-benzene and a larger quantity of a blowing agent of the type herein described.

Batch B shows the use of a blowing agent composed of one mole of biuret and one mole of urea to aid the action of sodium bicarbonate in blowing sponge rubber. This example illustrates the maximum amount of sodium bicarbonate which is preferably employed for the purpose of the invention. The use of more than about 12 parts of sodium bicarbonate per 100 parts of polymer is not recommended because of the possibility of "blooming" of the sodium bicarbonate to the surface of the stock. The present invention makes it possible to avoid blooming and at the same time obtain a sufficient blowing action.

Batch C illustrates the use of sodium bicarbonate and a blowing agent composed of one mole of biuret and one mole of urea. This is a formula which will give a sponge of moderate blow, average cell size, and moderately uniform cell structure. It has the advantage that it employs the relatively inexpensive sodium bicarbonate in conjunction with a more powerful blowing agent (one mole of biuret and one mole of urea).

Batch D illustrates a rubber sponge of great strength and resilience. Sodium bicarbonate alone does not provide sufficient blowing action to make a sponge rubber from a stock of this type containing carbon black. The employment of biuret and urea makes it possible to blow this stock. The cost of the blowing operation can be reduced somewhat by also employing a minor proportion of sodium bicarbonate.

It will be apparent that the quantity of the gas producing composition may vary in the practice of the present invention between 2.5 parts and 15 parts per 100 parts by weight of millable polymer. If the urea and biuret are used alone as a gas producing composition, it is preferable to employ the gas producing composition in quantities within the range of 4 parts to 15 parts per 100 parts by weight of polymer. Where the urea and biuret are employed in conjunction with other gas producing agents, more particularly sodium bicarbonate, ammonium bicarbonate and/or diazo-amino-benzene, the total quantity of urea and biuret may be reduced while still obtaining superior results with the combination of ingredients. For example, where the urea and biuret are employed in conjunction with sodium bicarbonate, or ammonium bicarbonate, the weight ratio of the total urea and biuret to the bicarbonate may vary within the range of 1:12 to 2:1 (see Example VI). Where the urea and biuret are employed in conjunction with diazo-amino-benzene, it is preferable to use less than 1 part of the diazo-amino-benzene and at least 2 parts of total urea and biuret per 100 parts by weight of polymer (see Example VI). In general, the biuret and urea together will form a minimum of at least 7.7% by weight of the gas producing composition.

It will be understood that the proportions of biuret and urea may be varied in the foregoing examples. Any substantial addition (1% or more) of urea to the biuret gives improved results over those obtained with either biuret or urea alone. In general, however, although it is preferable to use a major proportion of biuret, the amount of urea preferably should be at least 25% by weight of the composition. Typical formulas which have given very satisfactory results are:

(a) 63% biuret
37% urea
(b) 55% biuret
45% urea
(c) 70% biuret
30% urea

It will be understood that the amounts of the blowing agent used will vary somewhat depending upon the type of plastic composition which is being treated.

This invention is especially advantageous for compounding cellular products from synthetic rubbers. The compounding of natural rubber cellular products presents little difficulty compared with the problems encountered in making similar products from GR–S or other synthetics. Natural rubber is relatively easy to plasticize sufficiently so that any one of several gas producing agents has the ability to expand the rubber and hold it expanded until the cure is completed. Since even highly plasticized natural rubber has fairly good tensile strength, reinforcing fillers need not be used.

Most synthetics, on the other hand, are difficult to plasticize and reinforcing fillers must be used to obtain sufficient tensile strength for most purposes. Since reinforcing fillers generally cause a decrease in plasticity, it is necessary to balance the three factors of plasticity, reinforcement, and blowing power to produce satisfactory cellular products.

With a relatively weak blowing agent, such as sodium bicarbonate, it is possible to obtain a well blown product with little strength by using a highly plasticized but poorly reinforced stock, or a poorly blown but high strength sponge by using a reinforced stock which is not sufficiently plastic. Efforts to balance the two extremes often lead to products unsatisfactory in all respects.

In order to obtain good results, it is desirable to use a gas producing agent with sufficient blowing power so that the moderate reinforcing fillers can be incorporated into partially plasticized stock. The gas producing compositions provided in accordance with this invention fulfill these requirements and produce a sponge with high tensile strength and consequently good resilience.

Another advantage of the gas producing compositions of this invention over blowing agents such as sodium bicarbonate is that relatively small cells of uniform size are produced.

A further advantage of a mixture of biuret and urea over agents such as bicarbonate is the fact that it is not necessary to compress the finished article and break the cell walls. As a result the article has better resilience or ability to come back to normal when depressed.

In compounding stock for the production of cellular products with gas producing compositions as provided herein, it is not necessary to use other agents, such as fatty acids, since these compositions decompose directly into ammonia without any interaction with other materials. The only fatty acid necessary, namely, that required for accelerator activation, is usually present in sufficient quantity in the crude synthetic rubber.

Natural and synthetic rubbers may be described generically as sulfur vulcanizable rubbery polymers containing the butadiene 1,3 nucleus. Among the polymers classed as synthetic rubbers to which the invention is applicable are Buna N (a copolymer of butadiene and acrylonitrile); Buna S (a copolymer of butadiene and styrene); neoprene (a polymer of 2-chloro-1,3-butadiene); butyl rubber (a copolymer made from a high percentage of isobutylene and a minor percentage of isoprene); and Thiokol (the name given to a number of products prepared by the interaction of sodium tetrasulfide and certain dichloro compounds in which each of the chlorine atoms occupies an end position, such as the reaction between ethylene dichloride and sodium tetrasulfide which gives Thiokol A or the reaction between dichloroethyl ether and sodium tetrasulfide which gives Thiokol B). Additionally, the invention is applicable to other elastic polymers usually called plastics, e. g., vinyl polymers, such as polyvinyl chloride, polyvinyl acetate, polyvinylidene chloride, and copolymers, including Geon (a polyvinyl chloride polymer sold by B. F. Goodrich Chemical Company to other manufacturers who then process it into finished products); Koroseal (a trade name designating a polyvinyl chloride polymer sold as a finished product by B. F. Goodrich Co.); Vinylite (a copolymer of vinyl chloride and vinyl acetate made by Carbide and Carbon Chemicals Co.); and Saran (a polymer of vinylidene chloride and vinyl chloride, or a copolymer of vinylidene chloride and acrylonitrile made by Dow Chemical Company). It may be applied to plastics which are capable of being worked at moderate temperatures and of being set to a substantially permanent form by heating the expanded product, by cooling, or by chemical means.

It will be understood that this invention is not limited to the use of either the anhydrous or the hydrated forms of biuret and urea, but applies to the use of mixtures of biuret and urea in which either or both may be anhydrous or contain water of hydration.

An important feature of the compositions provided in accordance with this invention is their stability at temperatures up to about 120 degrees C. (250 degrees F.) and their ability to generate gas between the temperatures of 130 degrees C. and 177 degrees C. (266 degrees F. and 350 degrees F.), or at higher temperatures. The temperature preferably should be below the temperature at which substantial charring occurs. A preferred curing range is from about 287 degrees F. (142 degrees C.) to about 340 degrees F. (171 degrees C.).

Other advantages of these compositions are their relatively low cost, the ease of incorporating them into a solid rubber mix on the rubber mill, their ability to generate relatively large quantities of gas per unit weight of the chemical used, their ability to generate gas in medium sized cells or pockets (that is, neither too large nor too small), the fact that they generate a gas that does not easily diffuse through the rubber, and the fact that they generate a gas which remains in the gaseous state when the rubber product is cooled down to room temperature. Further advantages result from the fact that the gas producing compositions decompose into chemicals which are not harmful to the rubber product, to workers in the rubber factory, or to fabrics which come in contact with the finished product or with users of the product.

It will also be understood that the biuret and urea may be incorporated separately into the plastic material as, for example, on the rubber mill.

The invention is hereby claimed as follows:

1. A method of producing cellular products which comprises incorporating into a millable polymer which is plastic at temperatures in the range of 266 degrees F. to 350 degrees F. 4 to 15 parts per hundred parts by weight of said polymer of a gas producing composition, of which a major proportion is biuret and at least 1 per cent by weight is urea, and heating the resultant material to temperatures at which the biuret and urea react to produce ammonia.

2. A method of producing cellular products which comprises incorporating into a millable polymer which is plastic at temperatures in the range of 266 degrees F. to 350 degrees F. 4 to 15 parts per hundred parts by weight of said polymer of a gas producing composition, of which a major proportion is biuret and at least 1 per cent by weight is urea, heating the resultant material to temperatures at which the biuret and urea decompose to produce ammonia and expand said material, and setting said expanded material.

3. A method of producing cellular rubber products which comprises incorporating into a sulfur vulcanizable rubbery polymer of a compound containing the butadiene 1,3 nucleus 4 to 15 parts per hundred parts by weight of said polymer of a gas producing composition, of which a major proportion is biuret and at least 1 per cent by weight is urea, and heating the resultant rubbery mixture at temperatures sufficiently high to decompose said gas producing composition to form ammonia.

4. A method of producing cellular rubber products which comprises incorporating into a sulfur vulcanizable rubbery polymer of a compound containing the butadiene 1,3 nucleus 4 to 15 parts per hundred parts by weight of said polymer of a gas producing composition, of which a major proportion is biuret and at least 1 per cent by weight is urea, heating the resultant rubbery mixture at temperatures sufficiently high to decompose said gas producing composition to form ammonia thereby forming bubbles of gas within the rubber mixture and expanding it, and vulcanizing the rubber mixture while it is in said expanded state.

5. A method of producing cellular products which comprises incorporating into a sulfur vulcanizable synthetic rubber mixture containing the butadiene-styrene synthetic rubber 4 to 15 parts per hundred parts by weight of said synthetic rubber of a gas producing composition, of which a major proportion is biuret and at least 1 per cent by weight is urea, heating the resultant rubbery mixture at temperatures sufficiently high to decompose said gas producing composition to form ammonia and thereby to expand the synthetic rubber mixture by forming bubbles of gas therein, and vulcanizing the synthetic rubber mixture while it is in said expanded state.

6. A method of producing cellular rubber products which comprises incorporating into a sulfur vulcanizable rubbery polymer of a compound containing the butadiene 1,3 nucleus, at temperatures below 250 degrees F., 4 to 15 parts per hundred parts by weight of said polymer of a gas producing composition, of which a major proportion is biuret and at least 1 per cent by weight is urea, and then raising the temperature of said mixture to a temperature within the range of 266 degrees F. to 350 degrees F.

7. A method of producing cellular rubber products which comprises incorporating into a sulfur vulcanizable synthetic rubbery polymer of a compound containing the butadiene 1,3 nucleus, at temperatures below 250 degrees F., 4 to 15 parts per hundred parts by weight of said polymer of a gas producing composition, of which a major proportion is biuret and at least 1 per cent by weight is urea, and curing the resultant mixture at a temperature within the range of 287 degrees F. to 340 degrees F.

8. A method of producing cellular products which comprises incorporating into a millable polymer which is plastic at temperatures in the range of 266 degrees F. to 350 degrees F. 4 to 15 parts per hundred parts by weight of said polymer of a gas producing composition comprising a major proportion of biuret and a minor proportion of urea, the amount of urea being in excess of 25% by weight of the total amount of biuret and urea, and heating the resultant material to temperatures at which the biuret and urea react to produce ammonia.

9. A method of producing cellular rubber products which comprises incorporating into a sulfur vulcanizable rubbery polymer of a compound containing the butadiene 1,3 nucleus 4 to 15 parts per hundred parts by weight of said polymer of a gas producing composition containing a major proportion of biuret and a minor proportion of urea, the amount of urea being in excess of about 25% by weight of the total amount of biuret and urea, and curing the mixture at a temperature above about 287 degrees F. but below temperatures at which substantial charring occurs.

10. A composition of matter capable of yielding a gas expanded material upon heating, said composition comprising a millable polymer plastic at temperatures within the range of 266 degrees F. to 350 degrees F. intimately mixed with 4 to 15 parts per hundred parts by weight of said polymer of a heat decomposable gas producing composition consisting essentially of urea and biuret of which a major proportion is biuret and at least 1% by weight is urea.

11. A composition of matter capable of yielding a gas expanded material upon heating, said composition comprising a sulfur vulcanizable rubbery polymer of a compound containing the butadiene 1,3 nucleus which is plastic at temperatures within the range of 266 degrees F. to 350 degrees F., intimately mixed with a gas producing composition consisting essentially of 4 to 15 parts per hundred parts by weight of said polymer of urea and biuret, of which a major proportion is biuret and at least 1% by weight is urea.

References Cited in the file of this patent

UNITED STATES PATENTS

| | | |
|---|---|---|
| 1,503,429 | Russell | July 29, 1924 |
| 1,831,706 | Gams et al. | Nov. 10, 1931 |
| 1,981,722 | Ditmar | Nov. 20, 1934 |
| 2,195,623 | Harman | Apr. 2, 1940 |
| 2,250,192 | Cuthbertson | July 22, 1941 |
| 2,261,459 | Cooper et al. | Nov. 4, 1941 |
| 2,371,707 | Rainier et al. | Mar. 20, 1945 |

OTHER REFERENCES

Schwarz, India Rubber World, pp. 211, 212, 219, May 1946.